United States Patent
Berger et al.

(10) Patent No.: US 11,748,423 B2
(45) Date of Patent: Sep. 5, 2023

(54) PROVIDING USER SPECIFIC INFORMATION FOR SERVICES

(71) Applicants: Andreas Berger, Palo Alto, CA (US); Hans-Martin Hellebrand, Menlo Park, CA (US)

(72) Inventors: Andreas Berger, Palo Alto, CA (US); Hans-Martin Hellebrand, Menlo Park, CA (US)

(73) Assignee: HUMADA HOLDINGS INC., Palo Alto, CA (US)

( * ) Notice: Subject to any disclaimer, the term of this patent is extended or adjusted under 35 U.S.C. 154(b) by 476 days.

(21) Appl. No.: 16/708,040

(22) Filed: Dec. 9, 2019

(65) Prior Publication Data

US 2020/0117694 A1 Apr. 16, 2020

Related U.S. Application Data

(63) Continuation of application No. PCT/US2018/036450, filed on Jun. 7, 2018.
(Continued)

(51) Int. Cl.
| | |
|---|---|
| *G06F 16/95* | (2019.01) |
| *G06Q 30/02* | (2023.01) |
| *G06F 16/9535* | (2019.01) |
| *G06N 7/01* | (2023.01) |
| *G06Q 30/0251* | (2023.01) |

(52) U.S. Cl.
CPC ......... *G06F 16/9535* (2019.01); *G06N 7/01* (2023.01); *G06Q 30/0269* (2013.01)

(58) Field of Classification Search
CPC .... H04M 3/4931; H04L 67/02; H04L 12/282; G06V 40/173; G06F 16/41
See application file for complete search history.

(56) References Cited

U.S. PATENT DOCUMENTS 5,987,408 A * 11/1999 Gupta ................. H04M 3/4931
704/231
2013/0066982 A1 * 3/2013 Yoshinaga ......... G06Q 30/0241
709/206
(Continued)

OTHER PUBLICATIONS

Kai Shu et al., "User Identity Linkage across Online Social Networks: A Review", ACM SIGKDD Explorations Newsletter, Association for Computing Machinery, Inc., vol. 18, No. 2, pp. 5-17, Mar. 22, 2017, 13 pages.
(Continued)

*Primary Examiner* — Saba Dagnew
(74) *Attorney, Agent, or Firm* — Reinhart Boerner Van Deuren P.C.

(57) ABSTRACT

A method is disclosed in which one or more pieces of user information are obtained. The one or more pieces of user information are indicative of at least one attribute of a user and/or include at least one piece of information associated with the user. In the method, one or more pieces of user probability information are determined based on the one or more pieces of user information. The one or more pieces of user probability information are indicative of a probability that the one or more pieces of user information are linked to the user. One user identity is determined based on the one or more pieces of user probability information. It is further disclosed an according apparatus, computer program and system.

18 Claims, 8 Drawing Sheets

Related U.S. Application Data

(60) Provisional application No. 62/517,645, filed on Jun. 9, 2017.

(56) References Cited

U.S. PATENT DOCUMENTS

| | | | |
|---|---|---|---|
| 2013/0304732 A1* | 11/2013 | Tateno | G06F 16/284 |
| | | | 707/736 |
| 2014/0007017 A1 | 1/2014 | Sternfeld et al. | |
| 2014/0156806 A1 | 6/2014 | Karpistsenko et al. | |
| 2015/0120744 A1* | 4/2015 | Horn | G06F 16/41 |
| | | | 707/740 |
| 2015/0356091 A1 | 12/2015 | Zhao et al. | |
| 2016/0092699 A1* | 3/2016 | Riva | H04L 67/02 |
| | | | 726/26 |
| 2016/0092997 A1 | 3/2016 | Shen et al. | |
| 2017/0140213 A1* | 5/2017 | Brandt | G06V 40/173 |
| 2017/0288893 A1* | 10/2017 | Bunker | H04L 12/282 |

OTHER PUBLICATIONS

BC. Tomáš Jendek, "Intelligent Identity Information Processing", Slovak University of Technology in Bratislava, Faculty of Informatics and Information Technologies, May 1, 2014, http://wiki.evolveum.download/attachments/13074508/DP_jendek.pdf?version=1&modificationDate=1423904382451&api=v2, 87 pages.

\* cited by examiner

PROVIDING USER SPECIFIC INFORMATION FOR SERVICES

CROSS-REFERENCE TO RELATED PATENT APPLICATIONS

This patent application is a continuation of PCT Application No. PCT/US2018/036450, filed Jun. 7, 2018, which claims the benefit of U.S. Provisional Patent Application No. 62/517,645, filed Jun. 9, 2017, the entire teachings and disclosure of which are incorporated herein by reference thereto.

FIELD

The following disclosure relates to the field of providing user specific information for usage in services, or more particularly for usage in services that are personalized for a user. The disclosure relates to systems, apparatuses, and methods for providing user specific information for one or more services.

BACKGROUND

Digital services are harvesting large amount of information about users. Almost every service used by one or more users results in information around the individual that is stored independently by the service provider, e.g. organizations or companies offering services. The services provided can reach from online retailers to search engine providers and so on. The service providers use the stored information around a user or a group of users to provide tailored respectively personalized services (e.g. personalized advertising), to the user. In particular, providing personalized services enhances the probability of converting a user into a regular user.

Information about users stored at each service provider is typically not shared between different service providers, because the provided services are not linked. The user cannot or only in a very limited amount orchestrate or link different services to enhance his user experience based on information harvested about him.

SUMMARY

Personalized services require an accurate identification of the user so that information linked to the user can be used for providing personalized services. The service providers often require a user to login into his account, or require the user to enter his credentials, e.g. username and password, to authenticate himself against the service provider. However, such user identification enable only the usage of information about the user, which have been harvested by the service provider by themselves.

It is thus, inter alia, an object of the invention to provide an enhanced user identification based on obtained user information, to enable personalized services.

According to a first exemplary embodiment of the present invention, a method is disclosed, the method comprising:
 obtaining one or more pieces of user information, wherein the one or more pieces of user information are indicative of at least one attribute of a user and/or comprise at least one piece of information associated with the user;
 determining one or more pieces of user probability information based, at least in part, on the one or more pieces of user information, wherein one or more pieces of user probability information are indicative of a probability that the one or more pieces of user information are linked to the user;
 determining one user identity based, at least in part, on the one or more pieces of user probability information.

This method may for instance be performed and/or controlled by an apparatus, for instance a server. Alternatively, this method may be performed and/or controlled by more than one apparatus, for instance a server cloud comprising at least two servers. Alternatively, the method may for instance be performed and/or controlled by an electronic device, e.g. a mobile terminal. For instance, the method may be performed and/or controlled by using at least one processor of the electronic device.

According to a further exemplary aspect of the invention, a computer program is disclosed, the computer program when executed by a processor causing an apparatus, for instance a server, to perform and/or control the actions of the method according to the first exemplary embodiment.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary embodiment.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary embodiment.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a further exemplary aspect of the invention, a system is disclosed, comprising: an apparatus according to any aspect of the invention as disclosed above, and an electronic device, wherein the electronic device is configured to provide one or more pieces of user information.

In the following, exemplary features and exemplary embodiments of all aspects of the present invention will be described in further detail.

The one or more pieces of user information may for instance stem from an electronic device, which may for instance be different from the apparatus. The one or more pieces of user information may for instance be received from the electronic device, or from another entity. Another entity may for instance be any device capable of obtaining (e.g. gathering) user information. The one or more pieces of user information may for instance be originally of analogue type of information converted into digital one or more pieces of user information.

The electronic device may for instance be portable (e.g. weigh less than 5, 4, 3, 2 or 1 kg). The electronic device may for instance be at least temporarily (e.g. in removable form) or permanently installed, e.g. in a vehicle, in a building, or other location. The vehicle may for instance be a car, a truck, a motorcycle, a bicycle, a boat or a plane to name but a few examples. The building may for instance be any building, in particular a building publicly accessible, like banks, malls, shops, to name but a few examples. The electronic device permanently installed in a vehicle may for instance be a navigation device. The electronic device permanently installed in a building may for instance be an ATM, or an electronic device at gates to the building or to other certain locations (e.g. at airports, train stations, bus terminals, or the like), to name but a few non-limiting examples. The electronic device may for instance be an access controlling device. The electronic device may for instance comprise or be connectable to means for outputting sound, e.g. in the form of spoken commands. Alternatively or additionally, the electronic device may for instance comprise or be connectable to means for obtaining sound, e.g. inputting sound by means of a microphone or the like. Alternatively or additionally, the electronic device may for instance comprise or be connectable to means for obtaining a picture information, e.g. a camera for taking a photo or a video. The electronic device may for instance comprise or be connectable to one or more sensors for determining the devices position, such as for instance a Global Navigation Satellite System (GNSS) receiver. The electronic device may for instance comprise or be connectable to means for obtaining one or more pieces of user information, e.g. in the form of one or more sensors for obtaining such user information.

The one or more pieces of user information are obtained (e.g. received). The one or more pieces of user information may for instance be received from a server of a service provider. For instance, the server of the service provider receives one or more pieces of user information from an electronic device of a user. Additionally or alternatively, the server of the service provider may for instance gather the one or more pieces of user information. The one or more pieces of user information may for instance by gathered by the server of the service provider by harvesting information obtainable, e.g. accessible, based on the interaction between the server of the service provider and the user, in particular the electronic device of the user used for the interaction. The one or more pieces of user information are obtained, e.g. by receiving these gathered one or more pieces of user information from the server of the service provider. Alternatively, the one or more pieces of user information may for instance be received (directly) from an electronic device the user is using, e.g. the electronic device of the user.

The one or more pieces of user information are indicative of at least one attribute of a user and/or comprise at least one piece of information associated with the user. The one or more pieces of user information may for instance not be user credentials and/or not be information stored at an electronic device of a user, e.g. by the server of the service provider for this cause. For instance, the one or more pieces of user information may represent an (e.g. overall) available digital picture of the user. This digital picture may for instance comprise at least one attribute of the user (e.g. location, time, date, type of electronic device, to name but a few non-limiting examples), and/or comprise at least one piece of information associated with the user, which may for instance be obtained based on previous information. For instance, at a certain time of the day a user interacts with a server of a service provider, and/or the interaction takes place between a certain (electronic) device of the user, to name but a few non-limiting examples. The one or more pieces of user information may for instance be comprised by a request, which is obtained (e.g. received), e.g. from a server of the service provider. The request may for instance be a request for obtaining user specific information based, at least in part, on the one or more pieces of user information comprised by the request.

The one or more pieces of user probability information are indicative of a probability that the one or more pieces of user information are linked to the user. One or more pieces of user probability information are determined based, at least in part, on the one or more pieces of user information.

In case the one or more pieces of user probability information comprise more than one attribute of the user, and/or more than one piece of information associated with the user, or at least one attribute of the user and at least one piece of information associated with the user, a user probability information may for instance be determined for every piece of user information. Alternatively or additionally, only one piece of user probability information may for instance be determined for all pieces of user information.

One user identity is determined based, at least in part, on the one or more pieces of user probability information. For instance, more than one (e.g. at least two) users may be associated with the one user identity to be determined based, at least in part, on the one or more pieces of user probability information, e.g. because they have the same or similar probability than the one user to be determined. In order to determine one user identity, the user identity with the highest probability may for instance be determined. In case more than one users are associated with the same probability of the one or more pieces of user probability information, a certain attribute, or a certain piece of information associated with the user may be weighted so that the one user identity may for instance be determined, which has a higher determined user probability information of said certain attribute, or of said certain piece of information associated with the user. Additionally or alternatively, more than one (e.g. at least two) pieces of user probability information may be needed to be determined. The one user identity may for instance be stored in a database. One or more user identities may for instance be stored in the database. Further, at least one attribute of a user and/or at least one piece of information associated with the user linked to one or more user identities may for instance be stored in the database. Alternatively or additionally, the database may for instance comprise one or more pointers to user information (e.g. representing at least one attribute of a user and/or at least one piece of information associated with the user), which are linked to one or more user identities.

The one user identity may for instance be outputted, e.g. to a server or to another apparatus that transfers the one user identity to the server. The server may for instance be part of a server cloud. Alternatively, the one user identity may for instance be provided together with the determined one or more pieces of user probability information. In this way, it may for instance be checked whether a probability comprised by the one or more pieces of user probability information is equal than or above a predefined threshold. For instance, the threshold may be defined higher to provide a requested service from a server of a service provider (e.g. a third party) for services of higher security (e.g. money drawing from ATM(s), or ordering good(s) from online retailer(s)) compared to services of lower security (e.g. log-in into social media account), to name but a few non-limiting examples.

According to an exemplary embodiment of all aspects of the present invention, the determining of one or more pieces of user probability information further comprises checking the one or more pieces of user information against at least two sources, wherein for each source a user probability information is determined.

Source within the meaning of the present invention refers to a service provide owning or having access to stored user information. A source may for instance be information stored by a server of service providers. At least two sources may for instance be information stored by a server of (e.g. different) service providers.

It should be noted that the obtaining of one or more pieces of user information can take place in parallel, in case more than one piece of user information are obtained. Further, in case a first piece of user information is obtained, the steps of determining one or more pieces of user probability information and the step of obtaining a further piece of user information can take place in parallel. After determining the one or more pieces of user probability information, the step of determining one user identity can be performed and/or controlled. Further, the checking of the one or more pieces of user information against each of the at least two sources can take place in parallel.

According to an exemplary embodiment of all aspects of the present invention, the one or more pieces of user information are indicative of one or more of the following attributes:
 (i) location of the user;
 (ii) audio of the user;
 (iii) picture of the user;
 (iv) time and/or date of the user;
 (v) electronic device of the user;
 (vi) or a combination thereof.

Each of the attributes of the one or more pieces of user information may for instance be gathered, e.g. by and/or at a device (e.g. electronic device) the user is using (smartphone, tablet, navigation device, desktop computer, each of which does not have be one of the user, to name but a few non-limiting examples). Alternatively or additionally, each of the attributes of the one or more pieces of user information may for instance be gathered, e.g. by and/or at a device (e.g. electronic device) near which the user is located (ATM, gate(s) the user is proceeding through, to name but a few non-limiting examples).

The location of the user may for instance be obtained by one or more sensors, e.g. of an electronic device. The one or more sensors may for instance be adapted for determining the devices position, such as for instance a Global Navigation Satellite System (GNSS) receiver, e.g. a GPS receiver.

The audio of the user may for instance be obtained by means for obtaining sound, e.g. a microphone (e.g. of an electronic device) or the like.

The picture of the user may for instance be obtained by means for obtaining a picture information, e.g. a camera respectively camera sensor (e.g. of an electronic device) for taking a photo or a video.

The time and/or date of the user may for instance be obtained by the electronic device and be included in the obtained one or more pieces of user information. Alternatively or additionally, the time and/or date of the user may for instance be determined based on the time and/or date the one or more pieces of user information are obtained (e.g. received), e.g. at a server of a service provider.

The electronic device of the user may for instance be indicative of certain parameters of the electronic device of the user. For instance, one or more of the following parameters of the electronic device may be obtained: (i) model, (ii) manufacturer, (iii) software version (e.g. of operating system), (iv) application (and/or application version) executed by the electronic device, or (v) a combination thereof, to name but a few non-limiting examples. These aforementioned parameters may for instance be obtained based on information accessible on the electronic device, which was used by the user during obtaining the one or more pieces of user information.

The one or more pieces of user information may for instance represent visual information, e.g. picture, video to name but a few non-limiting examples. Alternatively or additionally, the one or more pieces of user information may for instance represent audiovisual information, e.g. video comprising audio information. The audiovisual information may for instance be a video stream, and/or a video livestream.

Additionally or alternatively, the one or more pieces of user information are indicative of health parameters associated with the user, e.g. body temperature, heart beat rate, blood pressure, to name but a few non-limiting examples.

Additionally or alternatively, the one or more pieces of user information are indicative of biometric information associated with the user, e.g. fingerprint information, iris scan information, face detection information, vein matching information, and/or voice tone information associated with the user. For example, biometric information may for instance be obtained (e.g. gathered) by one or more biometric sensors, wherein the one or more biometric sensors are coupable or comprised by the electronic device.

In an exemplary embodiment according to all aspects of the present invention, the checking is performed and/or controlled based on the at least one attribute of the user and/or the at least one piece of information associated with the user of the one or more pieces of user information, wherein for each source the user probability information is determined based on a potential match.

The potential match of the at least one attribute of the user and/or the at least one piece of information associated with the user with comparable at least one attribute and/or at least one piece of information associated with a user of each of the at least two sources may for instance be determined.

Comparable information of the at least two sources may for instance comprise indications to the name, address, picture, audio, location, or a combination thereof of the user, to name but a few non-limiting example. Further, each source itself may for instance be taken into account. For instance, at least one attribute of the user and/or at least one piece of information associated with the user of one source may for instance be more reliable than another source, e.g.

because the more reliable source is known to be verified, e.g. by other users, or other services, to name but a few non-limiting examples.

According to an exemplary embodiment of all aspects of the present invention, the checking comprises obtaining information of the at least two sources by using one or more pointers for each of the at least two sources.

One or more pointers may for instance point at one of the at least two sources, or in particular, at the information stored at the one of the at least two sources. The one or more pieces of information are accessed directly at the source by means of the one or more pointers. In this way, one or more pieces of user information of a source are not copied into another database for determining one or more pieces of user probability information. This enhances efficiency, e.g. less data traffic volume is generated, and the method may be even sped up due to the reduced data traffic volume.

By knowing the source of user information, the user information may for instance be pointed at. This can enable visibility and transparency. The user information may for instance be accessible at the source by the user. Therefore, user information may not only be showable, but also accessible, controllable and be deletable and/or portable. It may for instance be required that the user information is stored by a third party, and be accessible, controllable, deletable and/or portable by the user, or by another entity acting on behalf of the user. Third party may for instance be required to allow such a handling of user information due to corresponding one or more regulations (e.g. GDPR (General Data Protection Regulation)). The GDPR enforces third party service providers to not store or gather user information. But as already pointed out, user information is needed for providing personalized services based on user specific information.

In an exemplary embodiment according to all aspects of the present invention, the one or more pieces of user information are obtained by receiving a user identification and specification request, wherein at least a part of the user identification and specification request comprises the one or more pieces of user information.

The user identification and specification request may for instance stem from a server of a service provider (e.g. a third party). Alternatively, the user identification and specification request may for instance stem from an electronic device, e.g. of the user, or an electronic device of the user is using. For instance, it may be required that the user identification and specification request stems from the electronic device since a service requested by the user requires to do so. In this way, the compatibility e.g. to known authentication protocols may be enhanced.

Alternatively or additionally, the user identification and specification request may for instance comprises at least one attribute of the user and/or at least one piece of information associated with the user. The at least one attribute of the user and/or at least one piece of information associated with the user comprised by the user identification and specification request may for instance represent information an originator (e.g. the service provider, the third party, or the like) of the user identification and specification request is interested in. These information provided by the originator of the user identification and specification request may for instance be considered when determining one or more pieces of user specific information.

According to an exemplary embodiment of all aspects of the present invention, the method further comprises:
    determining one or more pieces of user specific information based, at least in part, on the one user identity, wherein the one or more pieces of user specific information are indicative of at least one certain information of the user.

One or more pieces of user specific information will be understood as information associated with the user, which are present in a digitized form. For instance, analog information associated with a user, e.g. appearance of the user, is an analog information. By obtaining e.g. one or more pieces of picture information representing the appearance of the user, e.g. by a camera sensor, the appearance of the user can be digitized by being represented by the one or more pieces of picture information.

The one or more pieces of user specific information are indicative of at least one certain (e.g. personalized) information of the user. The certain information may for instance represent an enriched information of the user, e.g. comprising useful insights, preferences, history, attributes of the user, to name but a few non-limiting examples.

The one or more pieces of user specific information may for instance be from a database, e.g. comprised by the apparatus, or connectable to the apparatus. Alternatively, the one or more pieces of user specific information may for instance be provided by using one or more pointers pointing at the determined user specific information, which are located (e.g. stored) at the original source, e.g. stored by a server of a service provider (e.g. a third party).

The one or more pieces of user specific information may for instance stem from at least two sources. The one or more pieces of user specific information may for instance be provided to a server of a service provider and stem from at least two sources. Thus, the service provider may for instance use more detailed user specific information, since the one or more pieces of user specific information may stem from at least two sources (e.g. service providers). In this way, for providing a personalized service, the service provider is not limited to user specific information gathered by themselves.

Further, exemplary embodiments of the method according to all aspects of the present invention enable to center user specific information and provide them to all kinds of service providers. Thus, a user can be offered personalized services from different service providers. The different service providers may for instance take into account a plurality of available user information, which are used to determine one or more pieces of user specific information. In this way, the level of personalization can be enhanced.

Third parties that participate in providing services as a service provider can harvest user information from personal information (e.g. one or more pieces of obtained user information) in the environment and deliver individualized advertisements, service and products, while enabling the user to use their personal information seamless between services.

In an exemplary embodiment according to all aspects of the present invention, the determining of one or more pieces of user specific information further comprises checking at least one rule information linked to the one user identity.

Based on the awareness that each user is regularly only input-creating for the service providers, but has no or only very limited access and control regarding the personal information stored about him, the checking comprises checking at least one rule information linked to the one user identity.

The at least one rule information may for instance be defined by the user, e.g. during an initial process for generating a user profile. For instance, the user may be required to perform a registration in order to use a service performing and/or controlling the method according to all aspects of the present invention. Additionally or alternatively, the at least one rule information may for instance be defined by the user by a change of his user profile. The user profile may for instance be generated during the initial process (e.g. registration process). Additionally or alternatively, the at least one rule information may for instance be defined according to e.g. one or more articles and/or rules of the GDPR.

In case the at least one rule information is indicative of user has not given his authorization for providing user specific information associated with the user, it may for instance be denied to provide the one or more pieces of user specific information for use in a service.

According to an exemplary embodiment of all aspects of the present invention, the at least one rule information represents one or more of the following:
(i) allowance information indicative of providing the one or more pieces of user specific information;
(ii) handling information of how the one or more pieces of user specific information can be provided;
(iii) compliance information of whether or not the one or more pieces of user specific information to be provided will be used according to the at least one rule information;
(iv) or a combination thereof.

The allowance information indicative of providing the one or more pieces of user specific information may for instance be the minimum necessary information represented by the at least one rule information, as described above.

The handling information of how the one or more pieces of user specific information can be provided may for instance be indicative of only allowing the providing of one or more pieces of user specific information in case the service provider (e.g. third party) agrees to delete information after usage. The service provider agreeing may for instance be the originator of the one or more pieces of user information, and will be the recipient of provided one or more pieces of user specific information.

The compliance information may for instance be a compliance acknowledgement of the service provider (e.g. the originator of the one or more pieces of user information). The compliance information may for instance be requested prior to providing the one or more pieces of user specific information, e.g. to the service provider (e.g. third party) respectively the originator of an user identification and specification request. The compliance information may for instance confirm that the service provider (e.g. third party) respectively the originator of an user identification and specification request will comply with the at least one rule information, or that the source storing the one or more pieces of user information used in the method according to all aspects of the present invention will comply with the at least one rule information.

In an exemplary embodiment according to all aspects of the present invention, the one or more pieces of user specific information are provided for use in a service.

The service may for instance be provided by a service provider (e.g. a third party respectively an originator of a user identification and specification request comprising obtained one or more pieces of user information). The service of the service provider may for instance be requested previously by the user, wherein the service provider may for instance need one or more pieces of user specific information for personalizing the requested service.

The one or more pieces of user specific information may for instance be outputted, e.g. to a server of a service provider or to another apparatus that transfers the one or more pieces of user specific information to a server of the service provider.

According to an exemplary embodiment of all aspects of the present invention, the method further comprises:
performing an action for the one user identity.

For instance, in order to enhance the anonymity of the user, which one or more pieces of user specific information may be used for providing a personalized service, an action which may indicate the identity of the user, may for instance be performed according to exemplary embodiments of the method according to all aspects of the present invention. For instance, the action to be performed may for instance be comprised by an user identification and specification request of a service provider (e.g. a third party). The action may for instance be to perform a transaction of money, a transmitting of a delivery address of the user (e.g. for online retailers) to postage service (in this way, the online retailer may not get knowledge about the address of the user), or the like to name but a few non-limiting examples.

Since the user specific information may for instance comprise only at least one attribute of the user and/or at least one piece of information associated with the user, the identity of the user may for instance be hidden for the service provider. The service provider only receives the one or more pieces of user specific information, which may not comprise any information regarding the identity of the user.

In an exemplary embodiment according to all aspects of the present invention, the method further comprises:
performing a handling of the one or more pieces of user specific information provided for use in a service, or used in a service.

For instance, the handling may comprise a deletion of the provided one or more pieces of user specific information. Additionally or alternatively, the handling may for instance be addressed at the at least two sources storing information of the user. In this way, the stored information of the user may for instance be changed and/or deleted by the user. This may for instance be performed and/or controlled under certain security aspects, e.g. ensuring that databases storing the information of the user and at which it may for instance be pointed at, are not at risk while allowing the pointer(s) to use information, or in case no pointer(s) is(are) used to change, port or delete information on behalf of user at a database storing the user information.

The system according to all aspects of the present invention may for instance embody an infrastructure for performing and/or controlling the method according to all aspects of the present invention. This infrastructure can facilitate a fast, secure and seamless availability of personal information or the insights generated using the personal information as well as identification and authentication between users and third parties. Further, anonymous usage of services is possible, since personal information of users may not be shared with the service provider (e.g. third party) or allow avatars for usage for certain services that one or more users want to use without sharing their identity. For instance, using pointer(s) into a direction of any personal information, e.g. in the internet or any none visible personal information created by a device connected to the infrastructure, user information may for instance be accessible. Thus, without storing the information, user information (e.g. in the form of attributes or other insides) may for instance be solely linked (e.g. connected) to the user.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION

The following description serves to deepen the understanding of the present invention and shall be understood to complement and be read together with the description as provided in the above summary section of this specification.

Figure 1:
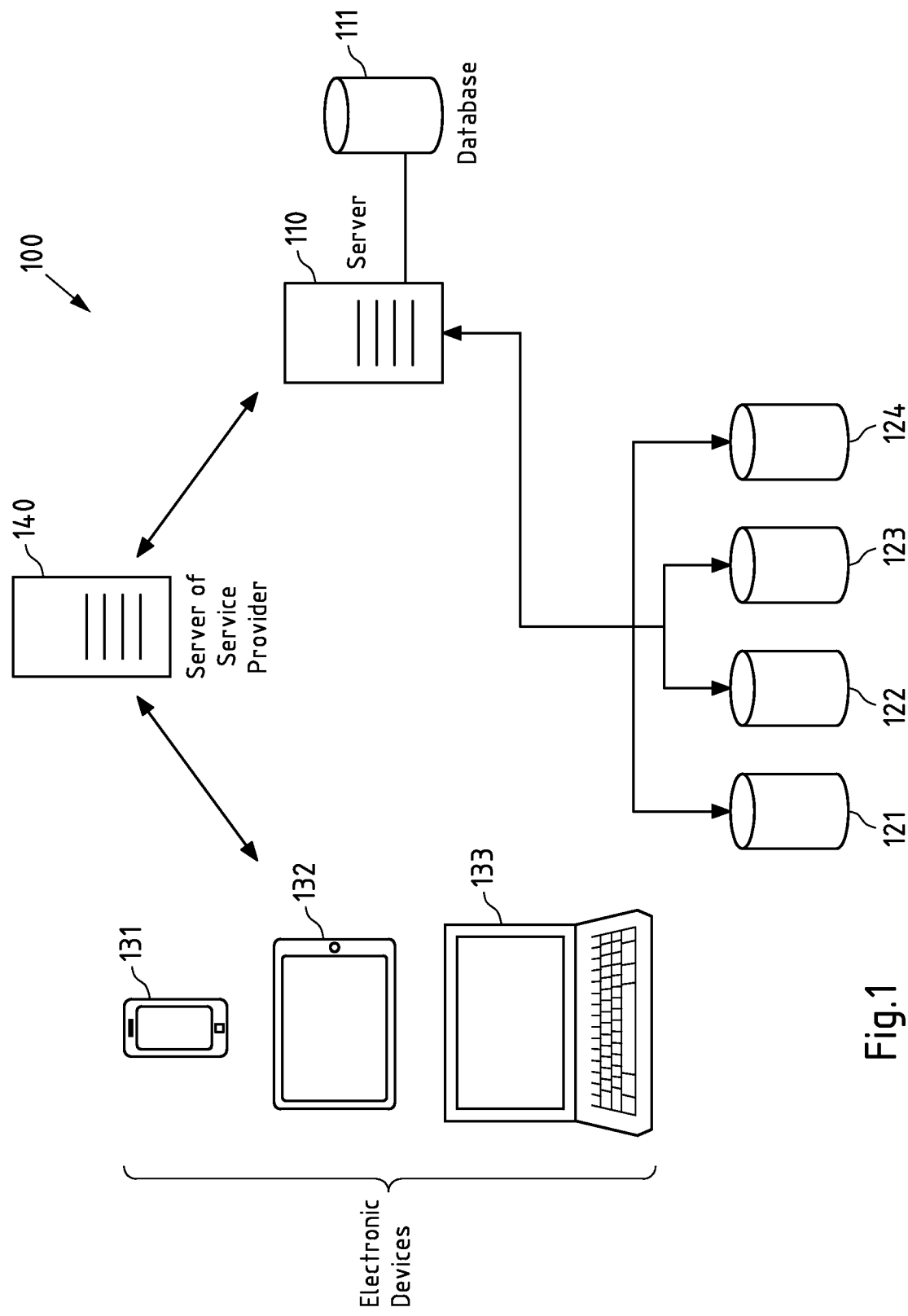
FIG. 1 shows a schematic block diagram of a system according to an exemplary aspect of the present invention.

FIG. 1 is a schematic block diagram of a system 100 according to an exemplary embodiment of the present invention. System 100 comprises a server 110 and a server 140, each of which may alternatively embodied as a server cloud (e.g. a plurality of servers connected e.g. via the internet and providing services at least partially jointly). Server 110 may be connected to a database 111. System 100 further comprises a plurality of data silos 121 to 124 (e.g. each for instance embodied as a database). The data silos may for instance be connected to server 110, e.g. via the internet and allowing access from the server 110 to data of the data silos 121 to 124. Further, system 100 comprises an electronic device, of which three different realizations are shown as non-limiting examples: a mobile device 131, a tablet 132 and a personal desktop computer 133. The electronic device, the server 140 and the server 110 may for instance be connected to each other, e.g. via the internet and allowing exchange of information.

According to an example embodiment, database 110 may for instance store one or more user identities. Each of the user identities may for instance be associated with user specific information, e.g. by one or more pointer pointing at different data silos 121 to 124 comprising such user specific information. The one or more pointers may for instance be stored in the database 111. Further, each of the user identities may for instance be associated with at least one rule information. The at least one rule information may for instance be stored in the database 111.

The electronic device 131 to 133 may for instance be configured to gather one or more pieces of user information. Additionally or alternatively, the server 140 may for instance be configured to obtain (e.g. gather) one or more pieces of user information. Server 140 may for instance obtain one or more pieces of user information by receiving the one or more pieces of user information gathered by the electronic device 131 to 133. Further, server 110 may obtain one or more pieces of user information, e.g. by receiving the one or more pieces of user information from server 140, or from electronic device 131 to 133.

One or more pieces of user specific information may for instance be stored at the data silos 121 to 124. Server 110 may for instance be configured to establish a communication connection with each of the data silos 121 to 124. Communication between server 110 and data silos 121 to 124, and/or between server 110 and server 140 may for instance take place at least partially in a wired function, e.g. based on Local Area Network (LAN), and/or Wide Area Network (WAN) communication. Additionally or alternatively, communication between server 140 and electronic device 131 to 133 may for instance take place at least partially wireless function, e.g. based on cellular radio communication or on Wireless Local Area Network (WLAN) based communication, to name but a few non-limiting examples.

Figure 2:
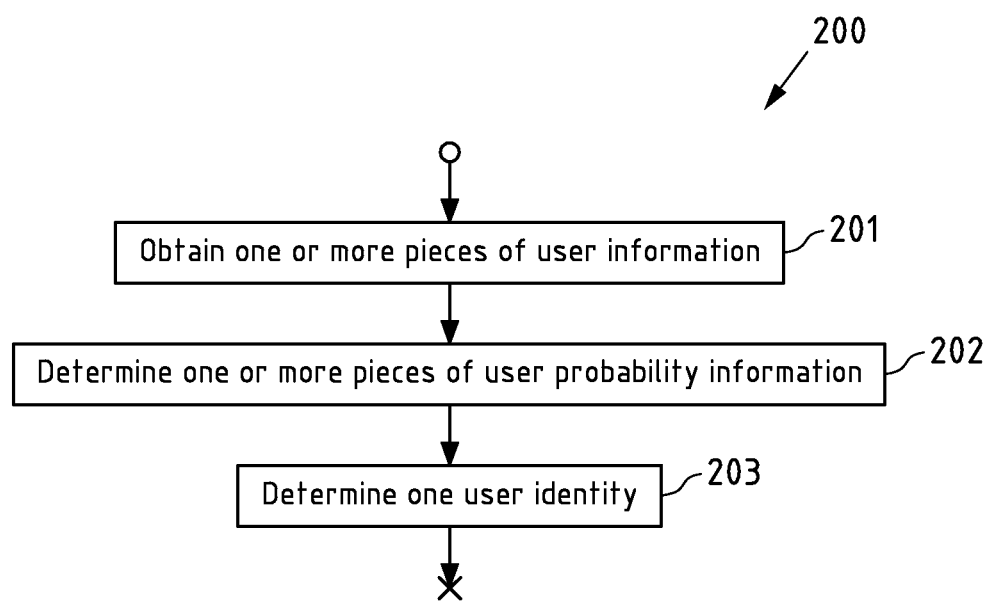
FIG. 2 shows a flowchart showing an example embodiment of a method according to the first exemplary aspect of the present invention.

FIG. 2 is a flowchart 200 showing an example embodiment of a method according to the first exemplary aspect of the present invention. This flowchart 200 may for instance be performed by server 110 of FIG. 1.

In step 201, one or more pieces of user information are obtained. The one or more pieces of user information are obtained (e.g. received), e.g. from electronic device 131 to 133, or from another entity, e.g. from server 140 of FIG. 1, which may have obtained (e.g. received) the one or more pieces of user information from electronic device 131 to 133. The one or more pieces of user information are indicative of at least one attribute of a user and/or comprise at least one piece of information associated with the user. For instance, the one or more pieces of user information may represent an (e.g. overall) available digital picture of the user. This may for instance comprise at least one attribute of the user (e.g. location, time, date, type of electronic device 131 to 133, to name but a few non-limiting examples), and/or comprise at least one piece of information associated with the user, which may for instance be obtained based on previous (e.g. historic) information. For instance, at a certain time of the day a user interacts with a server (e.g. server 140 of FIG. 1) of a service provider, and/or the interaction takes place between a certain (electronic) device (e.g. electronic device 131 to 133) of the user, to name but a few non-limiting examples.

In step 202, one or more pieces of user probability information are determined. The one or more pieces of user probability information are determined based, at least in part, on the one or more pieces of user information. The one or more pieces of user probability information are indicative of a probability that the one or more pieces of user information are linked to the user.

In step 203, one user identity is determined. The one user identity is determined based, at least in part, on the one or more pieces of user probability information. For instance, a higher value of a probability that the one or more pieces of user information are linked to the user of the one or more pieces of user probability information compared to a lower value of such a probability may lead to the result that the user identity of the user with the higher value of probability is determined, and vice versa.

Figure 3:
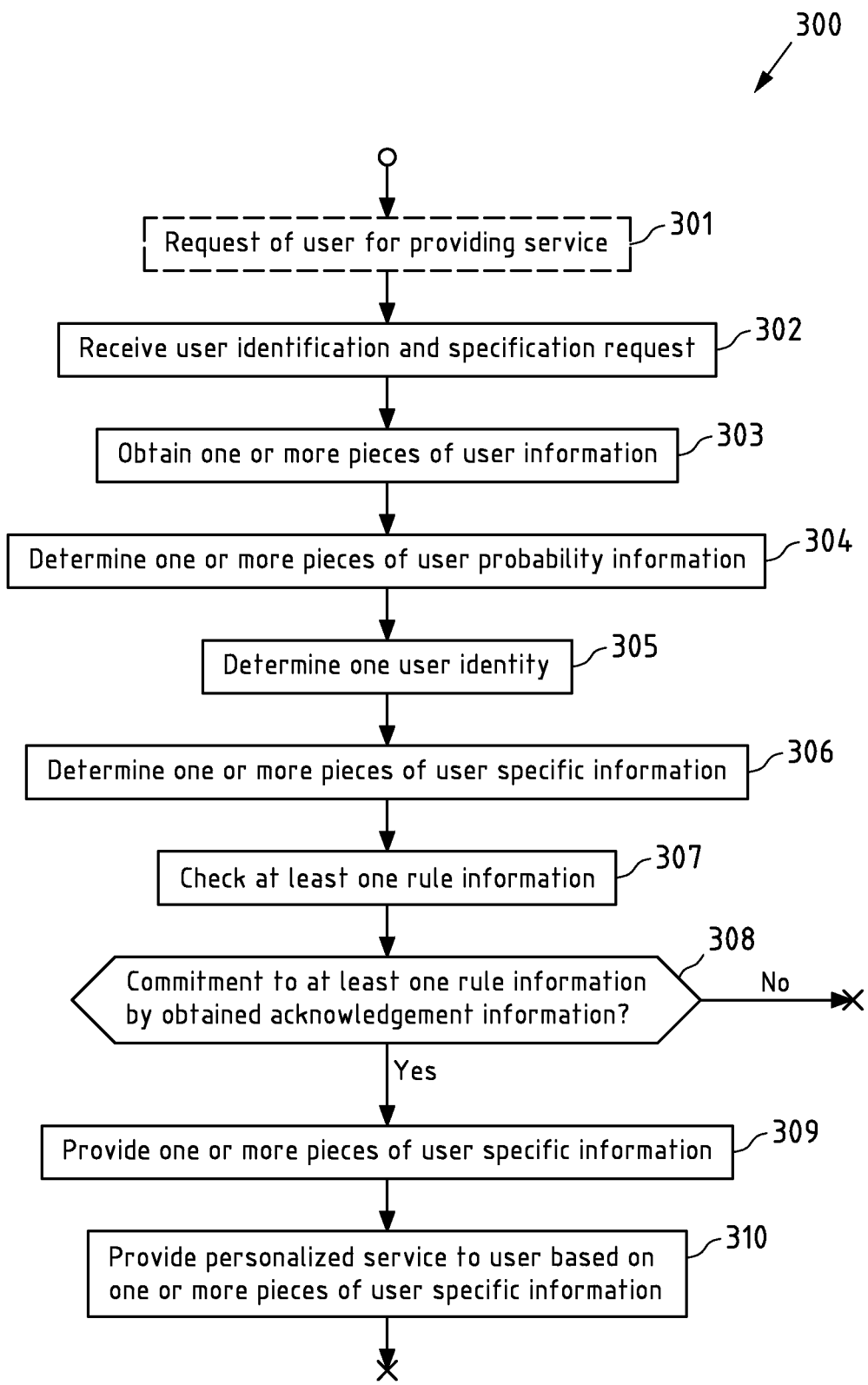
FIG. 3 shows a flowchart showing an example embodiment of a method according to the first exemplary aspect of the present invention.

FIG. 3 is a flowchart 300 showing an example embodiment of a method according to the first exemplary aspect of the present invention. This flowchart 300 may instance be performed by server 110, server 140 and/or electronic device 131 to 133 of FIG. 1.

In optional step 301, a user requests the provision of a service. For instance, a user may send the request to a server of a service provider (e.g. third party), e.g. from his electronic device. The request may be sent from electronic device 131 to 133 to server 140 of a service provider. Alternatively or additionally, the user may for instance browse the internet and visit a webpage of a service provider. The service provider may for instance like to provide a personalized service to the user, e.g. provide advertisements personalized for the user, and/or suggests product offerings personalized to the user. Thus, by using a service of a service provider, the service provider may like to provide a personalized to the user. In this case, no explicit request of the user for providing of a service is e.g. received.

In step 302, a user identification and specification request is received, e.g. from the server of the service provider (e.g. server 140 of FIG. 1). The request may for instance be received by server 110 of FIG. 1. As described with respect to step 301, such a user identification and specification request may for instance be generated by a server of the service provided based on an explicit request of a user for providing a service, and/or based on an event of the user, e.g. the user visits a webpage of a service provider.

In step 303, one or more pieces of user information are obtained. The one or more pieces of user information may for instance be received from the server of the service provider (e.g. server 140 of FIG. 1). For instance, the one or more pieces of user information may be comprised by the received user identification and specification request. Additionally or alternatively, the provision of one or more pieces of user information may be requested in order to provide one or more pieces of user specific information, which may be used by the service provider for the provision of a personalized service.

In step 304, one or more pieces of user probability information are determined. The one or more pieces of user probability information are determined, based at least in part, on the one or more pieces of user information, wherein one or more pieces of user probability information are indicative of a probability that the one or more pieces of user information are linked to the user.

Based, at least in part, on the one or more pieces of user probability information, one user identity is determined in step 305. The determined user identity is used for determining one or more pieces of user specific information in step 306.

The user from which the one or more pieces of user information are obtained, is unknown for the entity (e.g. the service provider, the third party), which wants to provide a personalized service. Based on the one or more pieces of user information, the user identity is determined. Thus, one user identity representing a unique user is determined, and one or more user specific information of that user are determined. Based on the one or more user specific information, the service provider can provide a personalized service to the user without knowing the identity of the user.

For enabling the user to control the one or more pieces of user specific information linked to him are handled by the service provider, at least one rule information is checked in step 307. The at least one rule information may for instance comprise information which data the service provider is allowed to see and/or how to use. For instance, some information (e.g. one or more pieces of obtained and stored user information) may be compromising for the user, so the user requests that these one or more pieces of user specific information are not provided to the service provider. Further, the at least one rule information may specify how the service provider can handle the provided one or more pieces of user specific information. For instance, the user may request that the service provider may use the one or more pieces of user specific information and delete them afterwards. Additionally or alternatively, the user may for instance request a commitment to the at least one rule information of the requesting service provider. For instance, an acknowledgement information of the service provider that the service provider will comply with the at least one rule information will be awaited. Thus, the at least one rule information and the acknowledgement information may for instance form a (e.g. micro) contract between the user and the service provider subject of which is how the service provider handles the one or more pieces of user specific information of the user. This is checked in step 308. In case the service provider does not commit to the at least one rule information, the performing and/or controlling of the method is aborted. In case the service provider does commit to the at least one rule information, it is proceeded with step 309.

In step 309, the determined one or more pieces of user specific information are provided, e.g. to the service provider, which is the originator of the user identification and specification request of step 302. For instance, the one or more pieces of user specific information are provided (e.g. transmitted) from server 110 of FIG. 1 to server 140 of FIG. 1. Alternatively, the providing of the one or more pieces of user specific information is caused, e.g. another entity is requested to transmit the one or more pieces of user specific information to the service provider (e.g. data silos 121 to 124 of FIG. 1 are requested to transmit the one or more pieces of user specific information to server 140 (of the service provider respectively third party) of FIG. 1).

Figure 4:
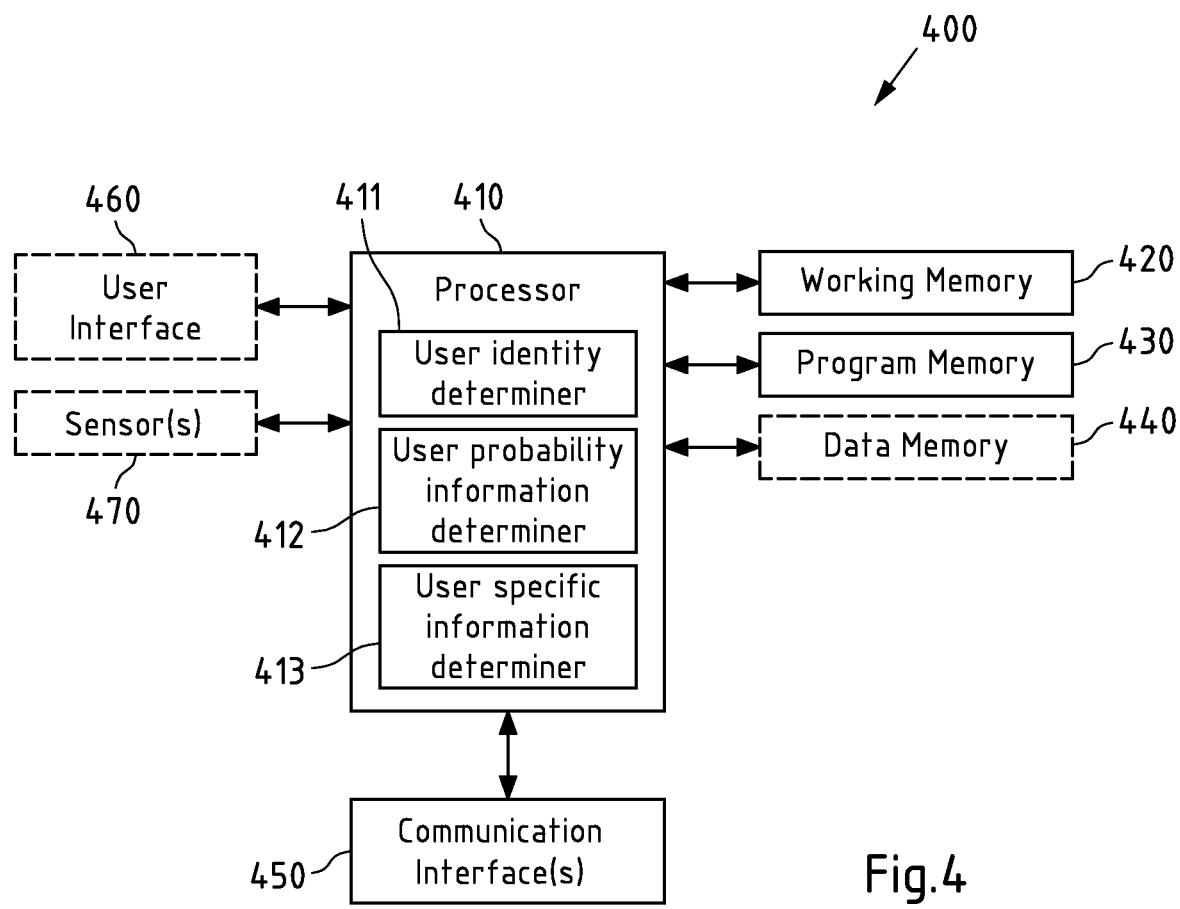
FIG. 4 shows a schematic block diagram of an apparatus according to an exemplary aspect of the present invention.

FIG. 4 is a schematic block diagram of an apparatus 400 according to an exemplary aspect of the present invention, which may for instance represent the electronic device 131, 132, and/or 133 of FIG. 1. Alternatively, the schematic block diagram of the apparatus 400 according to an exemplary aspect of the present invention may for instance represent server 110, and/or server 140 of FIG. 1.

Apparatus 400 comprises a processor 410, working memory 420, program memory 430, optional data memory 440, communication interface(s) 450, an optional user interface 460 and an optional sensor(s) 470.

Apparatus 400 may for instance be configured to perform and/or control or comprise respective means (at least one of 410 to 470) for performing and/or controlling the method according to the first exemplary aspect. Apparatus 400 may as well constitute an apparatus comprising at least one processor (410) and at least one memory (420) including computer program code, the at least one memory and the computer program code configured to, with the at least one processor, cause an apparatus, e.g. apparatus 400 at least to perform and/or control the method according to exemplary aspects of the invention.

Processor 410 may for instance comprise a user identity determiner 411, a user probability information determiner 412, a user specific information determiner 413, or a combination thereof as a functional and/or structural unit. User identity determiner 411 may for instance be configured to determine one user identity (see step 203 of FIG. 2). User probability determiner 412 may for instance be configured to determine one or more user probability information (see step 202 of FIG. 2). User specific information determiner 413 may for instance be configured to determine one or more pieces of user specific information (see step 307 of FIG. 3). Processor 410 may for instance further control the memories 420 to 440, the communication interface(s) 450, the optional user interface 460 and the optional sensor(s) 470.

Processor 410 may for instance execute computer program code stored in program memory 430, which may for instance represent a computer readable storage medium comprising program code that, when executed by processor 410, causes the processor 410 to perform the method according to the first exemplary aspect.

Processor 410 (and also any other processor mentioned in this specification) may be a processor of any suitable type. Processor 410 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 410 may for instance be an application processor that runs an operating system.

Program memory 430 may also be included into processor 410. This memory may for instance be fixedly connected to processor 410, or be at least partially removable from processor 410, for instance in the form of a memory card or stick. Program memory 430 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 430 may also comprise an operating system for processor 410. Program memory 430 may also comprise a firmware for apparatus 400.

Apparatus 400 comprises a working memory 420, for instance in the form of a volatile memory. It may for instance be a Random Access Memory (RAM) or Dynamic RAM (DRAM), to give but a few non-limiting examples. It may for instance be used by processor 410 when executing an operating system and/or computer program.

Data memory 440 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 440 may for instance store user specific information.

Communication interface(s) 450 enable apparatus 400 to communicate with other entities, e.g. with server 110, server 140, data silos 121 to 124, electronic device 131 to 133 of FIG. 1. The communication interface(s) 450 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 400 to communicate with other entities, for instance server 110, server 140, data silos 121 to 124, electronic device 131 to 133 of FIG. 1.

User interface 460 is optional and may comprise a display for displaying information to a user and/or an input device (e.g. a keyboard, keypad, touchpad, mouse, etc.) for receiving information from a user.

Sensor(s) 470 are optional and may for instance comprise a GPS receiver, means for obtaining sound, means for obtaining a picture information, an accelerometer, a gyroscope, or a combination thereof to name but a few non-limiting examples, e.g. to obtain (e.g. gather) user information.

Some or all of the components of the apparatus 400 may for instance be connected via a bus. Some or all of the components of the apparatus 400 may for instance be combined into one or more modules.

Figure 5:
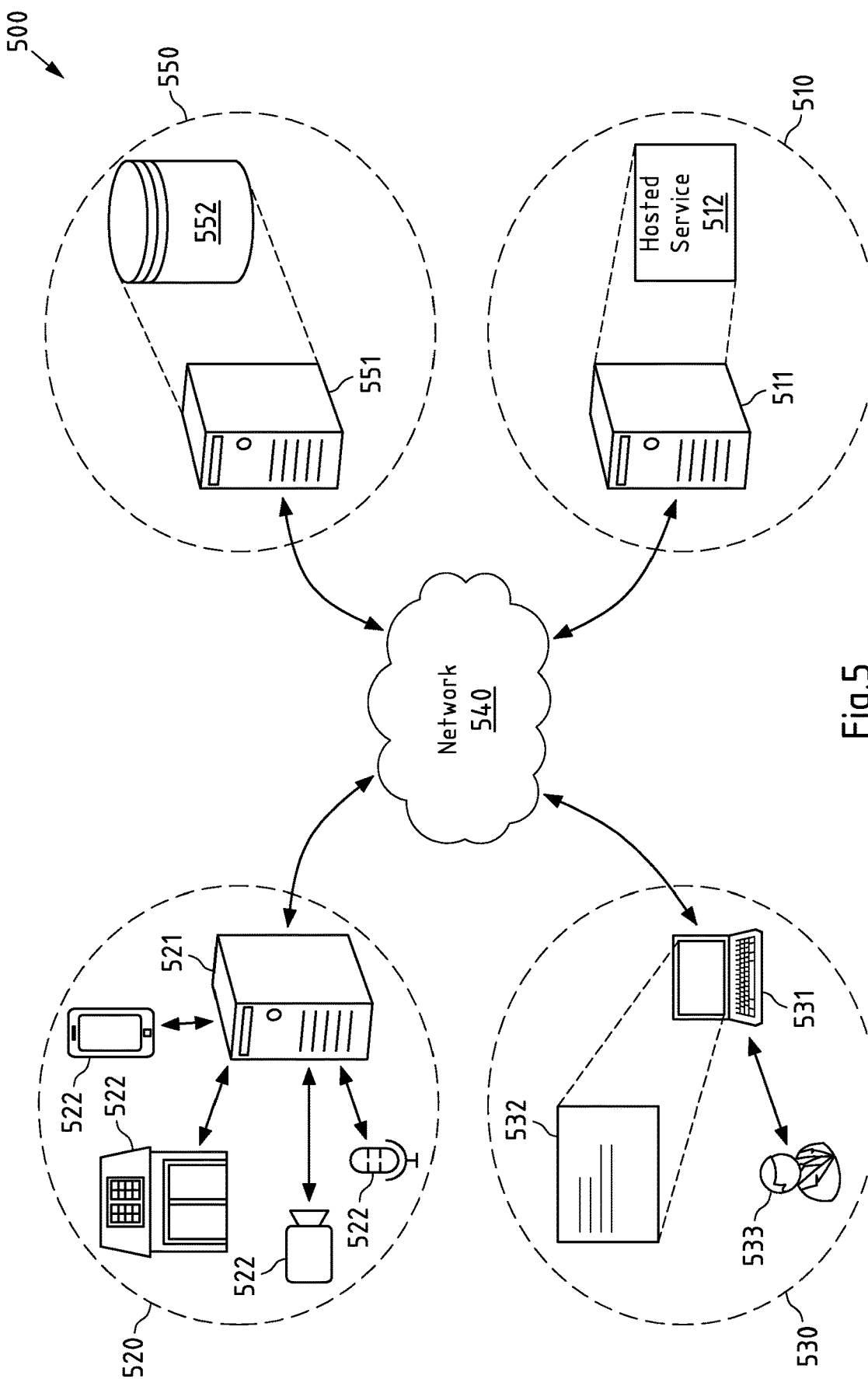
FIG. 5 shows a system according to an exemplary aspect of the present invention.

FIG. 5 shows a system according to an exemplary aspect of the present invention.

The system 500 may for instance be part of an environment for providing user specific information. The system 500 comprises a service layer 510, a data collection layer 520, a user system layer 530, a network 540 and an optional data storage layer 550.

The service layer 510 comprises a server 511 for providing the user specific information as a service. The service is marked by reference numeral 512 as a hosted service of server 511. The server 511 is configured to offer hosted and/or remote services. The service may for instance be requested by a request sent to server 511, e.g. over the network 540. For instance, the request may for instance stem from a third party, e.g. a third party which has obtained one or more pieces of user information, e.g. data collection server 521.

The data collection server 521 is comprised by the data collection layer 520. The data collection layer 520 further comprises one or more data sources 522, from which one or more pieces of user information may for instance stem. The data sources 522 may for instance be one or more electronic device (e.g. smartphones, tablet, desktop computer, to name but a few non-limiting examples), one or more stores and/or shopping retailers, one or more devices with one or more sensors, e.g. a camera, and/or a microphone to name but a few non-limiting examples. The data sources 522 may for instance be used for obtaining one or more pieces of user specific information, e.g. by server 521.

The user system layer 530 comprises an electronic device 531 (e.g. a smartphone, tablet, desktop computer to name but a few non-limiting examples) a user 533 can use. The electronic device 531 does not necessarily need to be the electronic device of the user. It may for instance be any electronic device accessible by the user, e.g. at public locations like stations or the like. The electronic device 531 may for instance provide a user interface 532 to the user, e.g. for performing a handling of the one or more pieces of user specific information provided for use in a service, or used in a service by the user. For instance, the user may define which one or more pieces of user specific information are allowed to be provided to third parties. Further, the user may define how the provided one or more pieces of user specific information are allowed to be handled by the third party, e.g. if they should be deleted after usage to name but one non-limiting example.

The optional data storage layer 550 may for instance store one or more pieces of user specific information. The data storage layer may for instance comprise on or more data silos 552 (cf. data silos 121 to 124 of FIG. 1). Server 511 may for instance be configured to establish a communication connection with each of the data silos 552.

Communication between server 511 and data silos 552, and/or between server 551 and server 520 may for instance take place at least partially in a wired function, e.g. based on Local Area Network (LAN), and/or Wide Area Network (WAN) communication. Additionally or alternatively, communication between server 520 and electronic device 531 may for instance take place at least partially wireless function, e.g. based on cellular radio communication or on Wireless Local Area Network (WLAN) based communication, to name but a few non-limiting examples. The communication may for instance be performed via the network 540.

Figure 6:
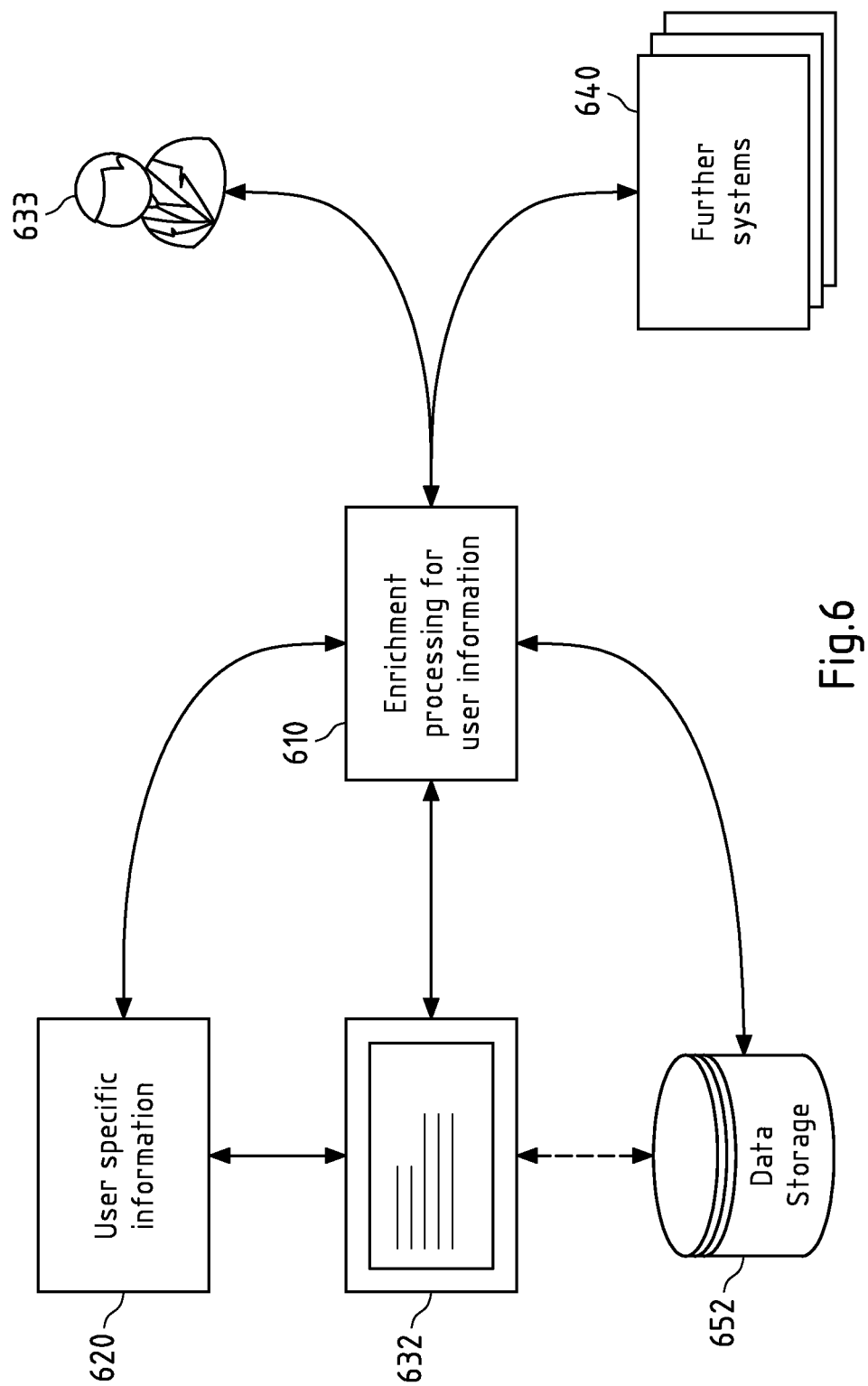
FIG. 6 shows a schematic block diagram of a use case of a system according to an exemplary aspect of the present invention.

FIG. 6 shows a schematic block diagram of a use case of a system according to an exemplary aspect of the present invention.

A user 633 may interact with, analyze, and/or otherwise process and/or distribute one or more pieces of user information stored by one or more data silos 652 (see data silos 121 to 124 of FIG. 1) using an enrichment process 610. For example, a user 633 may interact with and/or analyze one or more pieces of user information using a user interface 632 (see user interface 532 of FIG. 5). For instance, a user 652 and/or a group of users may utilize a number of interfaces to collaborate and/or coordinate analysis of available one or more pieces of user information. In some embodiments, systems 640 (e.g., automated control systems) may further interact with the enrichment processor for user information 208 in connection with analyzing and/or utilizing available one or more pieces of user information.

In interacting with one or more pieces of user information, users 633 and/or systems 640 may utilize a variety of functions to add, remove, update, integrate, slice, dice, filter, transform, process, visualize, query, and/or otherwise analyze available one or more pieces of user information. In some embodiments, such functions may be available to a user 633 via a symbolic representation (e.g., a text, binary, image, etc.) included in the user interface 632. Functions may be performed by the enrichment processor 610, usable by the user 633. In further embodiments, functions may be relayed to other systems (e.g., via the user interface 632) using e.g. a suitable network and/or data protocol and results may be aggregated and/or stored by the data silos 652. Additionally or alternatively, they are received to the users 633 and they are relayed to e.g. the enrichment processor 610. The enrichment processor may for instance be embodied by a server (e.g. server 110 of FIG. 1, or server 511 of FIG. 5).

In an exemplary embodiment, results of performed one or more enrichment processes by enrichment processor 610 using available functions may be in the form of data, code, algorithms, models, statistics, visualizations, and/or the like. The results may for instance be stored as one or more user specific information, e.g. in a user specific information storage 620. One or more user specific information may be shared and/or discussed between users 633 and/or third parties (e.g. third party server 140 of FIG. 1, server 520 of FIG. 5) using collaborative functionalities associated the user interface 632. For example, work performed using available user information and/or user information documents derived therefrom may be exchanged synchronously or asynchronously between users 633 and/or systems 640 and/or third parties (e.g. service providers; server 140 of FIG. 1, or server 520 of FIG. 5) during performance of the enrichment process 610 and/or after results are created.

Figure 7:
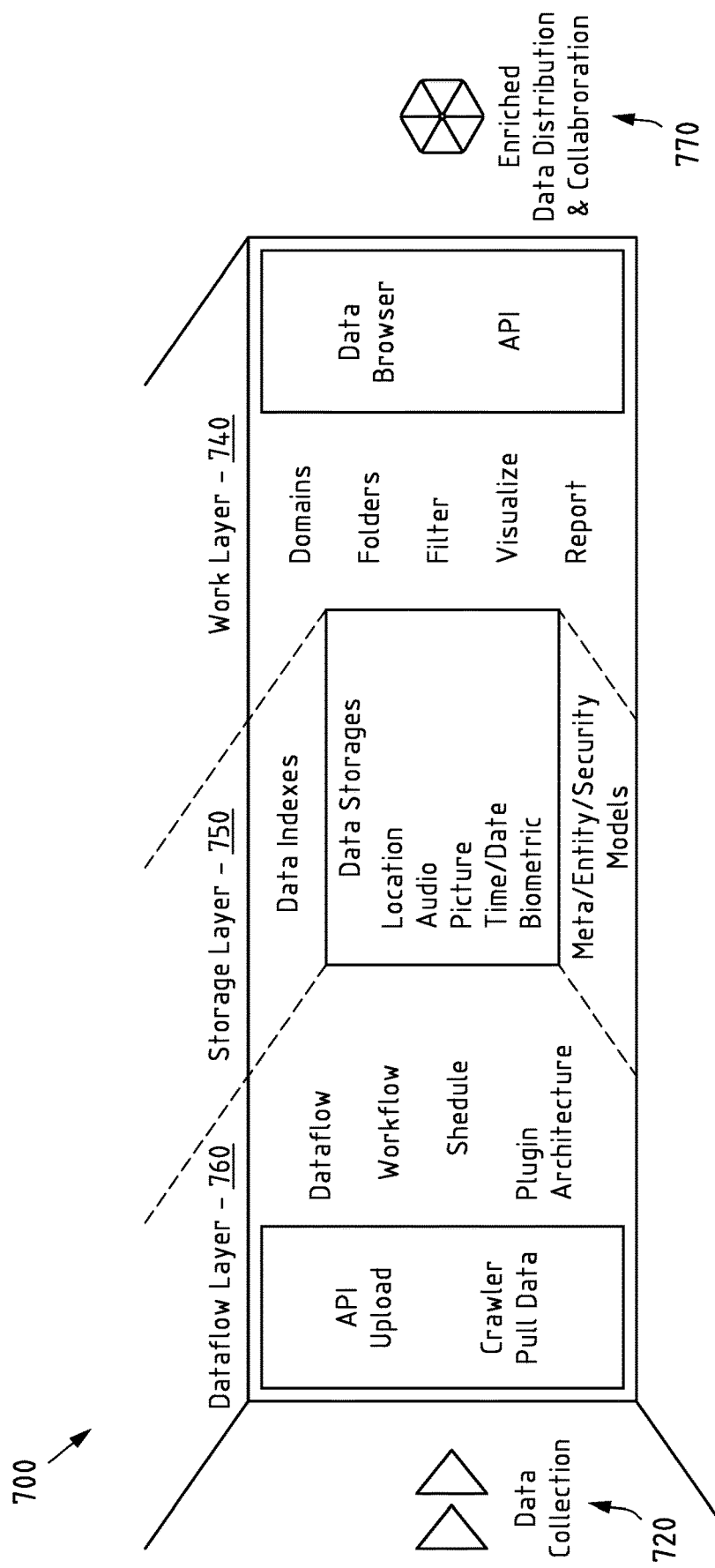
FIG. 7 shows a diagram showing an exemplary flow of information in connection with a system according to an exemplary aspect of the present invention.

FIG. 7 shows a diagram showing an exemplary flow of information in connection with a system according to an exemplary aspect of the present invention.

Particularly, the diagram 700 shows a flow of data in connection with a system or a method according to exemplary aspects of the present invention from data collection 710 to eventual use and distribution of data 770.

After a data collection of different available user information is completed, the obtained one or more pieces of user information may for instance be processed by the dataflow layer 760. The one or more pieces of user information may for instance be uploaded by an API. Additionally or alternatively, the one or more pieces of user information may for instance be gathered by a crawler, which may for instance pull the one or more pieces of user information. Events (e.g. crawling) of the dataflow layer 760 may be scheduled by a scheduler. For instance, a crawling for new user information may be performed to an assigned particular time, date, and/or periodicity. Further, events to be performed may be controlled by a plugin architecture. Such an architecture may for instance allow to obtain one or more pieces of user information according to e.g. rules defined by the plugin architection. Alternatively or additionally, events to be performed may be controlled by predefined workflows, e.g. crawling of predefined sources, which are likely to comprise one or more pieces of user information.

The storage layer 750 may for instance perform storage-related functions related to integrating, processing, and distributing of user information. Thus, as a result, e.g. one or more pieces of user specific information may be obtained. The data storages may for instance be associated with types of user information, e.g. location, audio, picture, time/date, and/or biometric related user information, to name but a few non-limiting examples. Alternatively or additionally, meta, entity or security models may be employed. E.g. user information of a source may be accompanied by meta data, which may for instance be used for determining the type (e.g. attribute) of the user information. Further, it may for instance be considered from which entity the user information stems. For instance, the user information may stem from a camera of an electronic device, or may stem from a public camera to name but a few examples.

Additionally or alternatively, a security model may for instance be employed, e.g. describing authentication and/or authorization setup in terms of principals, privileges and/or roles, data access restrictions with other domains, and/or which principals can collect what kind of data into the system.

The work layer 740 may for instance manage the system according to all aspects of the present invention, conduct collaborative analytics by system users, integrate with other instances of the system or other external systems, and/or provide a variety of services in connection with available user specific information. In exemplary embodiments according to all aspects of the present invention, the work layer 740 may offer services that allow for configuration of data collection, data transformations, and/or computations performed by the dataflow layer 760. Further services may for instance comprise management of user specific information requested by the user with whom the user specific information are associated with. For instance, the user specific information may be filtered, organized in folders (e.g. data of a folder may only be provided to certain third parties), visualized, reported, and/or further domains to be crawled for obtained additional pieces of user information may be entered by the user.

The data browser comprised by the work layer 740 may for instance enable a user to browse user specific information associated with him, or may allow to browse user specific information by third parties, e.g. via an API. For instance, the third party may be enabled to search for user specific information of interest to them to provide the best possible personalized service to the user.

Figure 8:
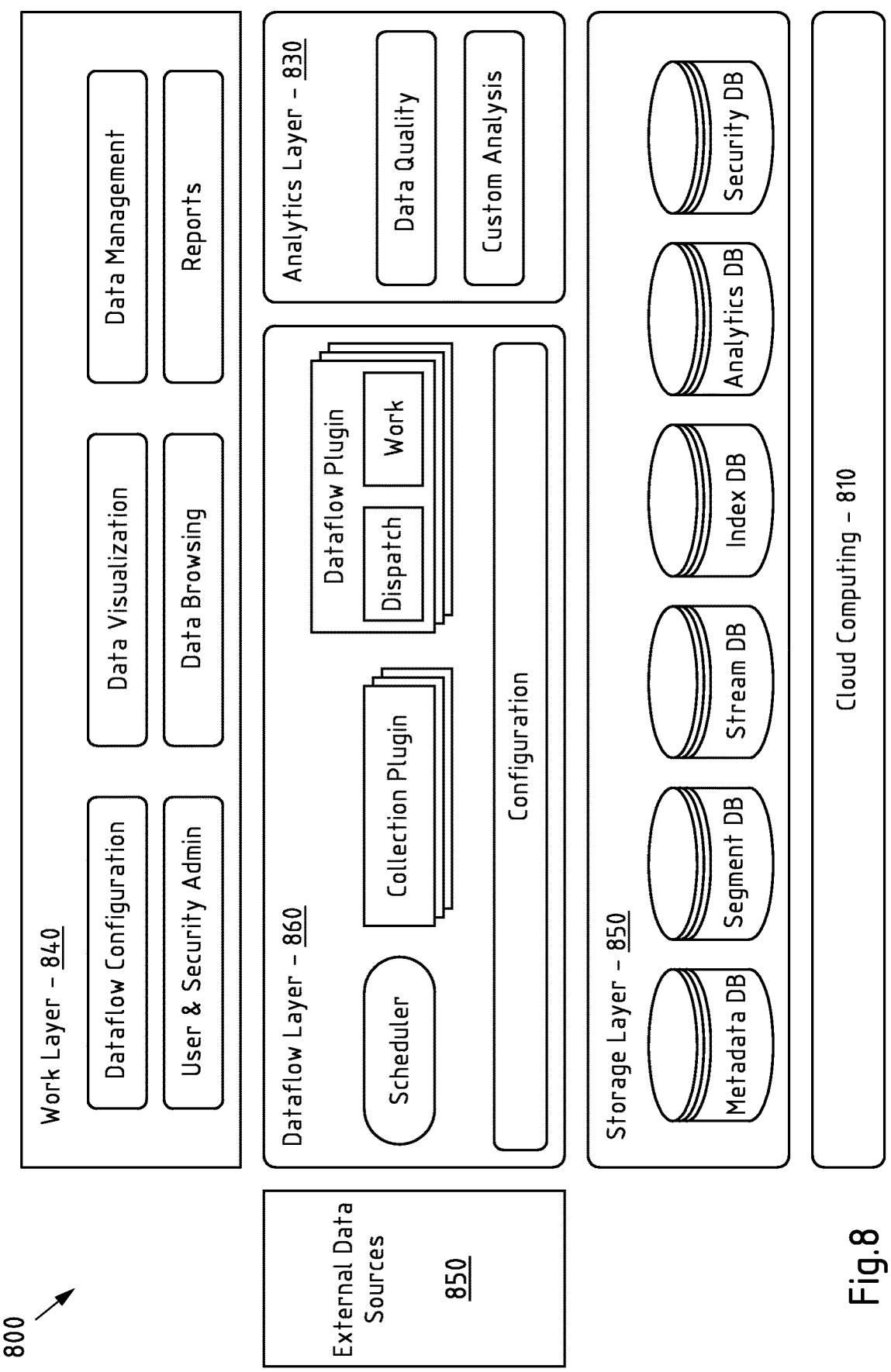
FIG. 8 shows an architecture of a system according to an exemplary aspect of the present invention.

FIG. 8 shows an architecture of a system according to an exemplary aspect of the present invention.

The work layer 840 may for instance comprise software-implemented methods for configuring functions performed by the dataflow layer 860, methods for managing data, methods for administering a user's profile (e.g., identification information associated with a user) and/or security information (e.g., security information relating to authentication of user rights to access certain data), methods for browsing data, methods for generating reports relating to data, and/or the like. Methods provided by the work layer 840 may be utilized in connection with data and/or other information associated with the dataflow layer 860, the storage layer 850, and/or the analytics layer 830.

The dataflow layer 860 may interface with one or more external data silos 850 and user information collected by the data silos 850.

In certain embodiments, data processing steps may be performed by dispatcher component(s), responsible for data flow control, and/or worker component(s), responsible for performing data transformation tasks. An exemplary dispatcher component may contain flow logic to decide when e.g. new user specific information can be enriched (e.g., realizing logical condition and/or barrier logic) with already obtained user specific information.

The storage layer 850 may implement one or more databases, including any of the databases described above. Aspects of the storage layer 850 may be implemented using a cloud computing infrastructure such as, for example, an AWS cloud. In further embodiments, some or all cloud computing infrastructure may be provided by a private cloud and/or a hybrid cloud.

The analytics layer 830 may for instance comprise software-implemented methods for performing data quality and/or other custom analytics processes that may be based on data associated with the dataflow layer 860, e.g. obtained one or more pieces of user information, and/or one or more pieces of user specific information, the storage layer 850, and/or the analytics layer 830. The analytics layer 830 may for instance perform and/or control detection of unreliable user information, detection of errors and/or outliers in user information and/or user specific information based e.g. on predefined rules and/or thresholds. For instance, in the case of one or more pieces of user information obtained by an electronic device (e.g. electronic device 131, 132, 133 of FIG. 1, electronic device 531 of FIG. 5) determining unreliabilities of user information, based, at least partially on already obtained user specific information, e.g. stored by the data silos. The user information could be analyzed based on e.g. known user specific information to identify, highlight, and/or distribute deviations in expected associations comprised by the user information The following embodiments shall also be considered to be disclosed:

Embodiment 1:

An apparatus, the at least one memory and the computer program code configured to, with the at least one processor, cause the apparatus further to perform:

obtaining one or more pieces of user information, wherein the one or more pieces of user information are indicative of at least one attribute of a user and/or comprise at least one piece of information associated with the user;

determining one or more pieces of user probability information based, at least in part, on the one or more pieces of user information, wherein one or more pieces of the user probability information are indicative of a probability that the one or more pieces of user information are linked to the user;

determining one user identity based, at least in part, on the one or more pieces of user probability information.

Embodiment 2:

The apparatus according to embodiment 1, wherein the determining of one or more pieces of user probability information further comprises checking the one or more pieces of user information against at least two sources, wherein for each source a user probability information is determined.

Embodiment 3:

The apparatus according to any of the preceding embodiments, wherein the one or more pieces of user information are indicative of one or more of the following attributes:

(i) location of the user;

(ii) audio of the user;

(iii) picture of the user;

(iv) time and/or date of the user;

(v) electronic device of the user;

(vi) or a combination thereof

Embodiment 4:

The apparatus according to any of the preceding embodiments, wherein the checking is performed and/or controlled based on the at least one attribute of the user and/or the at least one piece of information associated with the user of the one or more pieces of user information, wherein for each source the user probability information is determined based on a potential match.

Embodiment 5:

The apparatus according to any of the preceding embodiments, wherein the checking comprises obtaining information of the at least two sources by using one or more pointers for each of the at least two sources.

Embodiment 6:

The apparatus according to any of the preceding embodiments, wherein the one or more pieces of user information are obtained by receiving an user identification and specification request, wherein at least a part of the user identification and specification request comprises the one or more pieces of user information.

Embodiment 7:

The apparatus according to any of the preceding embodiments, the at least one memory and the computer program code configured to, with the at least one processor, cause the apparatus further to perform:

determining one or more pieces of user specific information based, at least in part, on the one user identity, wherein the one or more pieces of user specific information are indicative of at least one certain information of the user.

Embodiment 8:

The apparatus according to any of the preceding embodiments, wherein the determining of one or more pieces of user specific information further comprises checking at least one rule information linked to the one user identity.

Embodiment 9:

The apparatus according to any of the preceding embodiments, wherein the at least one rule information represents one or more of the following:
  (i) allowance information indicative of providing the one or more pieces of user specific information;
  (ii) handling information of how the one or more pieces of user specific information can be provided;
  (iii) compliance information of whether or not the one or more pieces of user specific information to be provided will be used according to the at least one rule information;
  (iv) or a combination thereof.

Embodiment 10:

The apparatus according to any of the preceding embodiments, wherein the one or more pieces of user specific information are provided for use in a service.

Embodiment 11:

The apparatus according to any of the preceding embodiments, the at least one memory and the computer program code configured to, with the at least one processor, cause the apparatus further to perform:
  performing an action for the one user identity.

Embodiment 12:

The apparatus according to any of the preceding embodiments, the at least one memory and the computer program code configured to, with the at least one processor, cause the apparatus further to perform:
  performing a handling of the one or more pieces of user specific information provided for use in a service.

Embodiment 13:

A method, e.g. performed and/or controlled by at least one apparatus, the method comprising:
  obtaining one or more pieces of user information, wherein the one or more pieces of user information are indicative of at least one attribute of a user and/or comprise at least one piece of information associated with the user;
  determining one or more pieces of user probability information based, at least in part, on the one or more pieces of user information, wherein the one or more pieces of user probability information are indicative of a probability that the one or more pieces of user information are linked to the user;
  determining one user identity based, at least in part, on the one or more pieces of user probability information.

Embodiment 14:

The method according to any of the preceding embodiments, wherein the determining of one or more pieces of user probability information further comprises checking the one or more pieces of user information against at least two sources, wherein for each source a user probability information is determined.

Embodiment 15:

The method according to any of the preceding embodiments, wherein the one or more pieces of user information are indicative of one or more of the following attributes:
  (i) location of the user;
  (ii) audio of the user;
  (iii) picture of the user;
  (iv) time and/or date of the user;
  (v) electronic device of the user;
  (vi) or a combination thereof.

Embodiment 16:

The method according to any of the preceding embodiments, wherein the checking is performed and/or controlled based on the at least one attribute of the user and/or the at least one piece of information associated with the user of the one or more pieces of user information, wherein for each source the user probability information is determined based on a potential match.

Embodiment 17:

The method according to any of the preceding embodiments, wherein the checking comprises obtaining information of the at least two sources by using one or more pointers for each of the at least two sources.

Embodiment 18:

The method according to any of the preceding embodiments, wherein the one or more pieces of user information are obtained by receiving an user identification and specification request, wherein at least a part of the user identification and specification request comprises the one or more pieces of user information.

Embodiment 19:

The method according to any of the preceding embodiments, the method further comprises:
  determining one or more pieces of user specific information based, at least in part, on the one user identity, wherein the one or more pieces of user specific information are indicative of at least one certain information of the user.

Embodiment 20:

The method according to any of the preceding embodiments, wherein the determining of one or more pieces of user specific information further comprises checking at least one rule information linked to the one user identity.

Embodiment 21:

The method according to any of the preceding embodiments, wherein the at least one rule information represents one or more of the following:
  (i) allowance information indicative of providing the one or more pieces of user specific information;
  (ii) handling information of how the one or more pieces of user specific information can be provided;
  (iii) compliance information of whether or not the one or more pieces of user specific information to be provided will be used according to the at least one rule information;
  (iv) or a combination thereof Embodiment 22:

A tangible computer-readable medium storing computer program code, the computer program code when executed by a processor causing an apparatus to perform and/or control:
  obtaining one or more pieces of user information, wherein the one or more pieces of user information are indicative of at least one attribute of a user and/or comprise at least one piece of information associated with the user;
  determining one or more pieces of user probability information based, at least in part, on the one or more pieces of user information, wherein one or more pieces of the user probability information are indicative of a probability that the one or more pieces of user information are linked to the user;
  determining one user identity based, at least in part, on the one or more pieces of user probability information.

Embodiment 23:

An apparatus configured to perform and/or control or comprising respective means for performing and/or controlling the method of any of the embodiments 13 to 21.

Embodiment 24:

An apparatus comprising at least one processor and at least one memory including computer program code, the at least one memory and the computer program code configured to, with the at least one processor, cause an apparatus at least to perform and/or control the method of any of the embodiments 13 to 21.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. An apparatus comprising at least one processor and at least one memory including computer program code, the at least one memory and the computer program code configured to, with the at least one processor, cause the apparatus to at least perform:
   obtaining one or more pieces of user information, wherein the one or more pieces of user information are indicative of at least one attribute of a user and/or comprise at least one piece of information associated with the user;
   determining one or more pieces of user probability information based, at least in part, on the one or more pieces of user information, wherein one or more pieces of user probability information are indicative of a probability that the one or more pieces of user information are linked to the user;
   determining one user identity based, at least in part, on the one or more pieces of user probability information,
   wherein the determining of one or more pieces of user probability information further comprises checking the one or more pieces of user information against at least two sources, wherein for each source a user probability information is determined,
   wherein the checking comprises obtaining information of the at least two sources by using one or more pointers for each of the at least two sources, and wherein the one or more pointers point at the information stored at the at least two sources.

2. The apparatus according to claim 1, further comprising: performing an action for the one user identity.

3. The apparatus according to claim 1, wherein the one or more pieces of user information are indicative of one or more of the following attributes:
   (i) location of the user;
   (ii) audio of the user;
   (iii) picture of the user;
   (iv) time and/or date of the user;
   (v) electronic device of the user;
   (vi) or a combination thereof.

4. The apparatus according to claim 1, wherein the checking is performed and/or controlled based on the at least one attribute of the user and/or the at least one piece of information associated with the user of the one or more pieces of user information, wherein for each source the user probability information is determined based on a potential match.

5. The apparatus according to claim 1, wherein the one or more pieces of user information are obtained by receiving an user identification and specification request, wherein at least a part of the user identification and specification request comprises the one or more pieces of user information.

6. The apparatus according to claim 1, the at least one memory and the computer program code configured to, with the at least one processor, cause the apparatus further to perform:
   determining one or more pieces of user specific information based, at least in part, on the one user identity, wherein the one or more pieces of user specific information are indicative of at least one certain information of the user.

7. The apparatus according to claim 6, wherein the determining of one or more pieces of user specific information further comprises checking at least one rule information linked to the one user identity.

8. The apparatus according to claim 7, wherein the at least one rule information represents one or more of the following:
   allowance information indicative of providing the one or more pieces of user specific information;
   (ii) handling information of how the one or more pieces of user specific information can be provided;
   (iii) compliance information of whether or not the one or more pieces of user specific information to be provided will be used according to the at least one rule information;
   (iv) or a combination thereof.

9. The apparatus according to claim 6, wherein the one or more pieces of user specific information are provided for use in a service.

10. A method, comprising:
   obtaining one or more pieces of user information, wherein the one or more pieces of user information are indicative of at least one attribute of a user and/or comprise at least one piece of information associated with the user;
   determining one or more pieces of user probability information based, at least in part, on the one or more pieces of user information, wherein the one or more pieces of user probability information are indicative of a probability that the one or more pieces of user information are linked to the user;
   determining one user identity based, at least in part, on the one or more pieces of user probability information, wherein the determining of one or more pieces of user probability information further comprises checking the one or more pieces of user information against at least two sources, wherein for each source a user probability information is determined,
   wherein the checking comprises obtaining information of the at least two sources by using one or more pointers for each of the at least two sources, and wherein the one or more pointers point at the information stored at the at least two sources.

11. The method according to claim 10, further comprising:
   performing an action for the one user identity.

12. The method according to claim 10, wherein the one or more pieces of user information are indicative of one or more of the following attributes:
   (i) location of the user;
   (ii) audio of the user;
   (iii) picture of the user;
   (iv) time and/or date of the user;
   (v) electronic device of the user;
   (vi) or a combination thereof.

13. The method according to claim 10, wherein the checking is performed and/or controlled based on the at least one attribute of the user and/or the at least one piece of information associated with the user of the one or more pieces of user information, wherein for each source the user probability information is determined based on a potential match.

14. The method according to claim 10, wherein the one or more pieces of user information are obtained by receiving an user identification and specification request, wherein at least a part of the user identification and specification request comprises the one or more pieces of user information.

15. The method according to claim 10, the at least one memory and the computer program code configured to, with the at least one processor, cause the apparatus further to perform:
   determining one or more pieces of user specific information based, at least in part, on the one user identity, wherein the one or more pieces of user specific information are indicative of at least one certain information of the user.

16. The method according to claim 15, wherein the determining of one or more pieces of user specific information further comprises checking at least one rule information linked to the one user identity.

17. The method according to claim 16, wherein the at least one rule information represents one or more of the following:
   (i) allowance information indicative of providing the one or more pieces of user specific information;
   (ii) handling information of how the one or more pieces of user specific information can be provided;
   (iii) compliance information of whether or not the one or more pieces of user specific information to be provided will be used according to the at least one rule information;
   (iv) or a combination thereof.

18. A tangible computer-readable medium storing computer program code, the computer program code when executed by a processor causing an apparatus to perform and/or control:
   obtaining one or more pieces of user information, wherein the one or more pieces of user information are indicative of at least one attribute of a user and/or comprise at least one piece of information associated with the user;
   determining one or more pieces of user probability information based, at least in part, on the one or more pieces of user information, wherein the one or more pieces of user probability information are indicative of a probability that the one or more pieces of user information are linked to the user;
   determining one user identity based, at least in part, on the one or more pieces of user probability information,
   wherein the determining of one or more pieces of user probability information further comprises checking the one or more pieces of user information against at least two sources, wherein for each source a user probability information is determined,
   wherein the checking comprises obtaining information of the at least two sources by using one or more pointers for each of the at least two sources, and
   wherein the one or more pointers point at the information stored at the at least two sources.

\* \* \* \* \*

UNITED STATES PATENT AND TRADEMARK OFFICE
CERTIFICATE OF CORRECTION

| | | |
|---|---|---|
| PATENT NO. | : 11,748,423 B2 | Page 1 of 1 |
| APPLICATION NO. | : 16/708040 | |
| DATED | : September 5, 2023 | |
| INVENTOR(S) | : Andreas Berger et al. | |

It is certified that error appears in the above-identified patent and that said Letters Patent is hereby corrected as shown below:

In the Claims

Claim 8, Line 4 reads "allowance information indicative of providing the one or" and should read --(i) allowance information indicative of providing the one or--

Signed and Sealed this
Seventeenth Day of October, 2023

*Katherine Kelly Vidal*

Katherine Kelly Vidal
*Director of the United States Patent and Trademark Office*